(12) United States Patent
Sawasaki (10) Patent No.: US 7,136,135 B2
(45) Date of Patent: Nov. 14, 2006

(54) SUBSTRATE FOR LIQUID CRYSTAL DISPLAY AND LIQUID CRYSTAL DISPLAY HAVING THE SAME

(75) Inventor: Manabu Sawasaki, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/697,712

(22) Filed: Oct. 30, 2003

(65) Prior Publication Data

US 2004/0125322 A1    Jul. 1, 2004

(30) Foreign Application Priority Data

Oct. 31, 2002    (JP)    ............... 2002-317721

(51) Int. Cl.
*G02F 1/1339*    (2006.01)
*G02F 1/1333*    (2006.01)

(52) U.S. Cl. ...................... 349/156; 349/110

(58) Field of Classification Search ............... 349/156, 349/106, 110
See application file for complete search history.

(56) References Cited

U.S. PATENT DOCUMENTS 5,969,784 A * 10/1999 Miyazaki et al. ........... 349/155
6,445,437 B1 * 9/2002 Miyazaki et al. ........... 349/156
6,798,486 B1 * 9/2004 Yanagawa et al. ......... 349/156

FOREIGN PATENT DOCUMENTS

| JP | 2000-305086 | 11/2000 |
|----|-------------|---------|
| JP | 2001-075500 | 3/2001 |
| JP | 2001-201750 | 7/2001 |

* cited by examiner

Primary Examiner—Toan Ton
(74) Attorney, Agent, or Firm—Greer, Burns & Crain, Ltd.

(57) ABSTRACT

The invention relates to liquid crystal displays used in display sections of electronic apparatus and substrates for a liquid crystal display used for the same and provides a liquid crystal display having high luminance and high display characteristics and a substrate for a liquid crystal display used in the same. A configuration is employed which includes a pair of substrates provided opposite to each other, a liquid crystal sealed between the substrate, a black matrix formed like a grid on one of the substrates, a plurality of pixel regions defined by the black matrix, and a pillar spacer formed on the black matrix and provided such that it protrudes from the black matrix into four adjoining pixel regions when viewed in a direction perpendicular to the surface of one of the substrates.

9 Claims, 9 Drawing Sheets

SUBSTRATE FOR LIQUID CRYSTAL DISPLAY AND LIQUID CRYSTAL DISPLAY HAVING THE SAME

BACKGROUND OF THE INVENTION

1. Field of the Invention

The present invention relates to a liquid crystal display used in a display section of an electronic apparatus and a substrate for a liquid crystal display used in the same.

2. Description of the Related Art

A liquid crystal display has a pair of substrates having transparent electrodes on surfaces thereof opposite to each other and a liquid crystal layer sealed between the substrates. In the liquid crystal display, a voltage is applied between the transparent electrodes to drive the liquid crystal, thereby controlling the transmittance of light at each pixel. Recently, there are increasing demands for liquid crystal displays, and requirements for liquid crystal displays are also diversifying. In particular, improvement of display quality is strongly demanded.

Active matrix liquid crystal displays that are the main stream of liquid crystal displays have a thin film transistor (TFT) as a switching element at each pixel. The thickness (cell gap) of the liquid crystal layer of a liquid crystal display is maintained by spherical spacers or rod-shaped spacers. The spherical spacers or rod-shaped spacers are made of plastic or glass. Normally, those spacers are dispersed on one of the substrates at a spacer dispersing step. The two substrates are thereafter combined and are pressed from the outside such that a cell gap on the order of the diameter of the spacers is maintained.

However, since the spacers are provided also in the pixels, they can result in an alignment defect of the liquid crystal and leakage of light. When there is an alignment defect of the liquid crystal or leakage of light, a reduction of contrast or glare on the display screen occur to reduce display quality. Increases in the size of substrates have made it difficult to disperse spacers uniformly. When spacers are ununiformly dispersed, variations of the cell gap occur in the plane of the substrate, which results in irregularities of luminance. In particular, liquid crystal displays of the IPS (in-plane switching) mode and MVA (multi-domain vertical alignment) mode undergo greater changes in luminance in response to changes in the cell gap compared to TN (twisted nematic) mode liquid crystal displays. Therefore, control must be performed to provide a more uniform cell gap in order to achieve display without irregularity of luminance. Further, since the trend towards finer pixels has resulted in reductions in the area of one pixel, the area occupied by a spacer relative to a pixel is becoming greater, and the influence of spacers on display quality is therefore becoming more significant.

The above-described problem is solved by the use of pillar spacers (post spacers) constituted by a photosensitive resin and formed at a photolithographic step. Since pillar spacers are formed at a photolithographic step, they can be provided in an arbitrary density in regions which are shielded from light with a light-shield film (herein after also referred to as black matrix (BM)). Since this prevents the occurrence of alignment defects of a liquid crystal or leakage of light at pixels, neither reduction of contrast nor glare occurs. Since pillar spacers allow a film to be formed with a uniform thickness (height), a uniform cell gap can be maintained throughout the plane of a substrate. Therefore, there will be no irregularity of luminance attributable to variation of a cell gap. Thus, the use of pillar spacers makes it possible to provide a liquid crystal display having high display characteristics.

Figure 7:
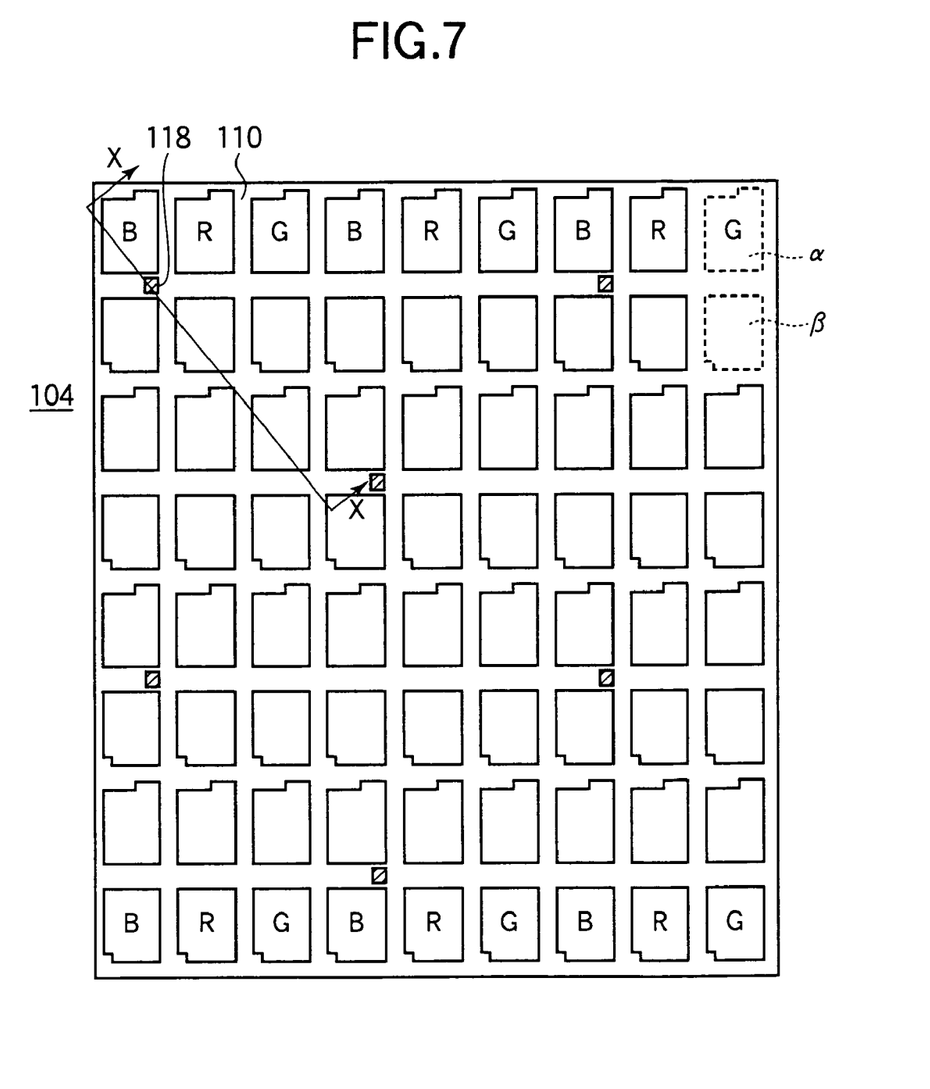
FIG. 7 shows a configuration of a substrate for a liquid crystal display according to the related art.
Figure 8:
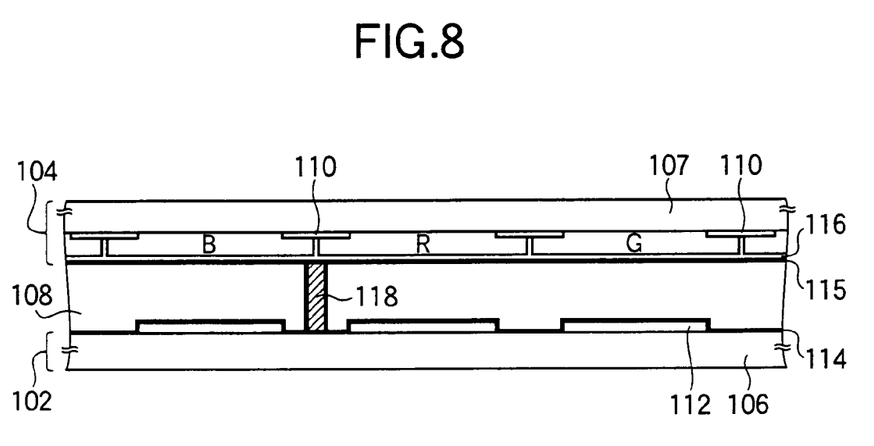
FIG. 8 is a sectional view showing a configuration of a liquid crystal display according to the related art.

FIG. 7 shows a configuration of an opposite substrate of a liquid crystal display according to the related art. FIG. 8 shows a sectional configuration of the liquid crystal display taken along the line X—X in FIG. 7. As shown in FIG. 7 and FIG. 8, a BM 110 in the form of a grid for shielding light is formed on a glass substrate 107 that constitutes an opposite substrate 104. Although not shown, TFTs, gate bus lines and drain bus lines are formed on a TFT substrate 102 in regions which are shielded from light by the BM 110. Pixel regions of the opposite substrate 104 are defined by the BM 110. Since the BM 110 also shields storage capacitor bus lines (not shown) formed on the TFT substrate 102 across the pixel regions, two apertures α and β indicated by broken lines in FIG. 7 constitute one pixel.

A color filter (CF) layer in any of red (R), green (G) and blue (B) is formed at each of the pixel regions of the opposite substrate 104. For example, CF layers R, G and B are formed like stripes extending in the vertical direction in FIG. 7. A common electrode 116 constituted by a transparent conductive film is formed throughout the substrate over the CF layers R, G and B. An alignment film 115 is formed throughout the substrate over the common electrode 116.

The TFT substrate 102 has a pixel electrode 112 formed in each of the pixel regions on the glass substrate 106. An alignment film 114 is formed throughout the substrate over the pixel electrodes 112.

A liquid crystal 108 is sealed between the opposite substrate 104 and the TFT substrate 102. A cell gap is maintained by pillar spacers 118 which are formed in the regions shielded from light by the BM 110 on the opposite substrate 104. In FIG. 7, the pillar spacers 118 are formed in regions which are located on the BM 110 shielding the storage capacitor bus lines from light and in which the CF layers B are formed, one spacer being provided for every six pixels.

Figure 9A:
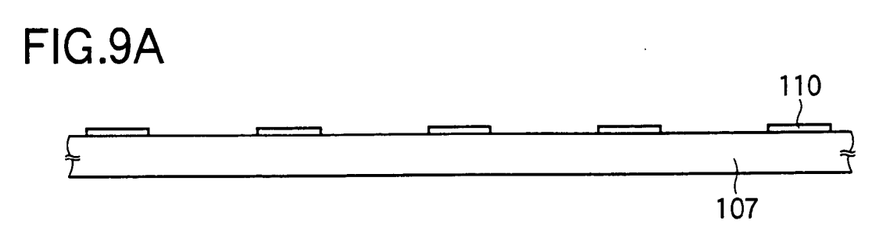
FIGS. 9A to 9D are sectional views taken in processes showing a method of manufacturing a liquid crystal display according to the related art.
Figure 9B:
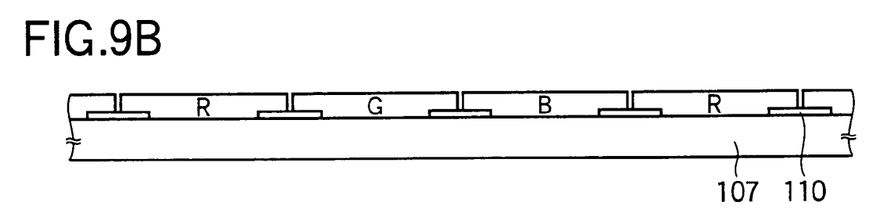
Figure 9C:
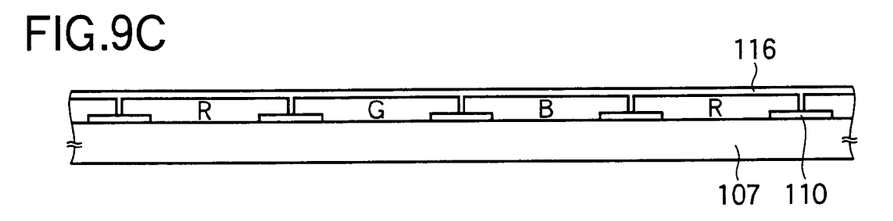

A description will now be made with reference to FIGS. 9A to 9D on a method of manufacturing an opposite substrate 104 and a liquid crystal display having the same according to the related art. First, as shown in FIG. 9A, a film of a metal such as chromium (Cr) or a black resin film is formed throughout a top surface of a transparent and insulating glass substrate 107 and is patterned to form a BM 110. Next, as shown in FIG. 9B, CF layers in R, G and B are sequentially formed like stripes using a pigment-dispersion type photosensitive colored resins, or the like. Next, as shown in FIG. 9C, a transparent conductive film such as an ITO (indium tin oxide) is formed throughout the substrate over the CF layers R, G and B using a sputtering process to form a common electrode 116. Prior to the formation of the common electrode 116, the surface of the substrate may be planarized by applying an acrylic resin or epoxy resin or the like on the CF layers R, G and B to form an overcoat layer.

Figure 9D:
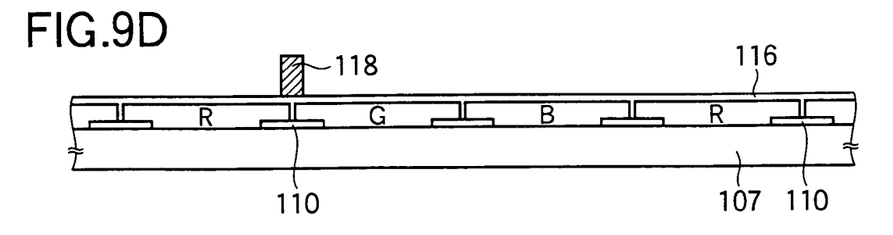

For example, an acrylic resin type negative photosensitive resist is then applied throughout the substrate. Subsequently, as shown in FIG. 9D, pillar spacers 118 are formed in an arbitrary density in arbitrary positions using a photolithographic process. The pillar spacers 118 are provided only on the BM 110. Since the accuracy of the height of the pillar spacers 118 is important, they are preferably formed on CF layers in any one of the colors R, G and B if possible considering differences in thickness between the CF layers R, G and B. An opposite substrate 104 is completed through the above-described steps.

Next, an alignment film 115 is applied throughout a top surface of the opposite substrate 104, and an alignment film 114 is applied through a top surface of a TFT substrate 102 which has been manufactured through an array fabrication step. Next, the alignment films 114 and 115 are rubbed in a predetermined direction. The substrates 102 and 104 are then combined such that their surfaces on which the alignment films 114 and 115 are formed face each other, and a liquid crystal is injected between the substrates 102 and 104. A liquid crystal display is manufactured through the above-described steps. The pillar spacers 118 may be formed on the TFT substrate 102.

Patent Document 1: Japanese Patent Application Laid-Open No. JP-A-2000-305086

Patent Document 2: Japanese Patent Application Laid-Open No. JP-A-2001-75500

Patent Document 3: Japanese Patent Application Laid-Open No. JP-A-2001-201750

Normally, the pillar spacers 118 are formed with a dimension in the range of 10~30 µm×10~30 µm square and a height in the range from 4 to 5 µm. At the rubbing step, the alignment film 114 or 115 is not sufficiently rubbed in regions around the pillar spacers 118. Therefore, the alignment film 114 or 115 in the regions cannot be provided with a predetermined alignment regulating force, and regions having liquid crystal alignment defects are formed around the pillar spacers 118. The regions having liquid crystal alignment defects are also formed around the pillar spacers 118 because of the influence of the spacers themselves. It is therefore necessary to provide the pillar spacers 118 in positions where their neighborhoods can be sufficiently shielded from light with the BM 110 in order to prevent any reduction in display quality even when there are irregularities in the alignment of the liquid crystal.

Recent demands for liquid crystal displays with higher definition and higher transmittance have resulted in a trend toward an improved aperture ratio which is to be achieved by forming the BM 110 with a smaller width here. A problem therefore arises in that it is difficult to reserve sufficient spaces to shield the neighborhoods of the pillar spacers 118 from light. In some occasions, however, the BM 110 must be formed with a great width to shield the neighborhoods of the pillar spacers 118. As a result, the aperture ratio of pixels is decreased, which results in the problem of a reduction in the display luminance of a liquid crystal display.

Physical properties of the material of which the pillar spacers 118 are formed, e.g., compressive displacement and plastic deformation are important in designing the density in which the pillar spacers 118 are to be provided. Therefore, a design is employed which provides the spacers with flexibility to follow up thermal expansion and contraction of the liquid crystal and hardness to endure the application of a pressure. Pillar spacers 118 designed to satisfy such conditions are normally provided in a density of about one spacer per several pixels. When the BM 110 is formed with a great width only in positions where the pillar spacers 118 are provided or when no particular light shielding is performed in the neighborhoods of the pillar spacers 118 conversely, a problem arises in that the transmittance of pixels in the neighborhoods of the pillar spacers 118 becomes lower than that of other pixels and therefore results in display irregularities that are visually perceived on the screen.

SUMMARY OF THE INVENTION

It is an object of the invention to provide a liquid crystal display having high luminance and high display characteristics and a substrate for a liquid crystal display used in the same.

The above-described object is achieved by a liquid crystal display, characterized in that it has a pair of substrates provided opposite to each other, a liquid crystal sealed between the substrates, a light-shielding film formed like grids on one of the substrates, a plurality of pixel regions defined by the light-shielding film, and a pillar spacer provided such that a region having an alignment defect of the liquid crystal is formed across adjoining ones of the pixel regions when viewed in a direction perpendicular to the surface of the substrate.

DESCRIPTION OF THE PREFERRED EMBODIMENTS

Figure 1:
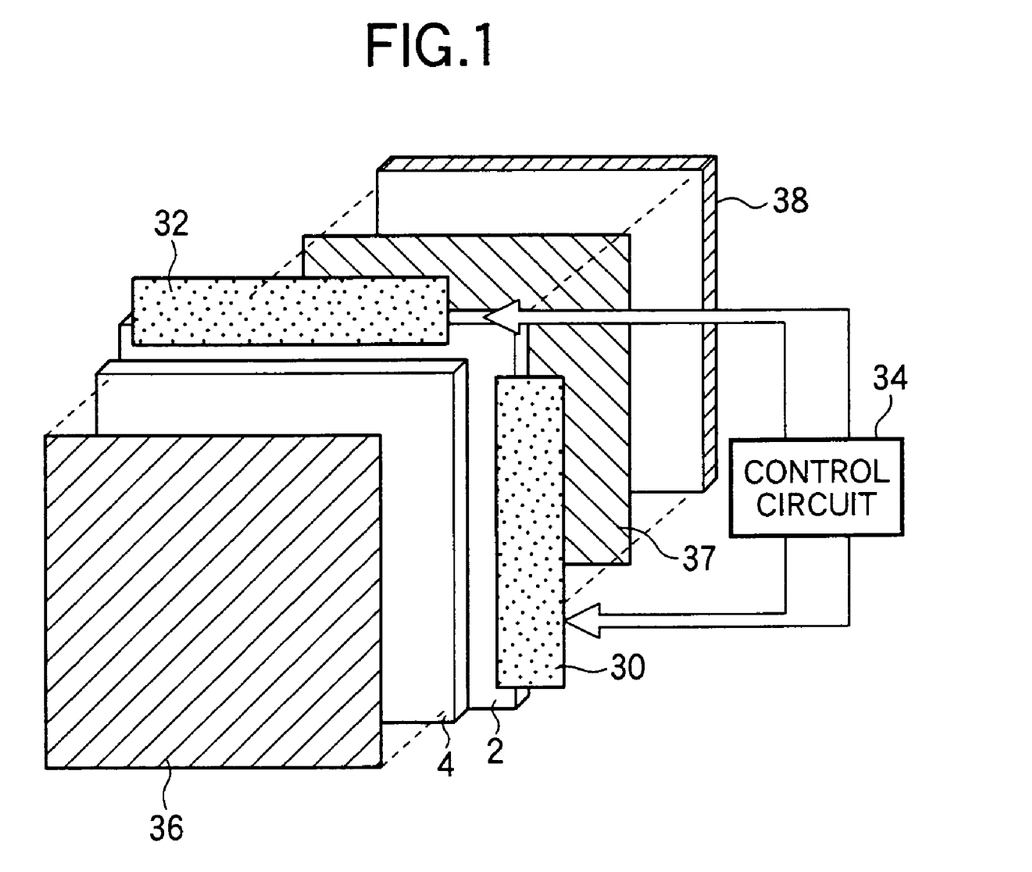
FIG. 1 shows a schematic configuration of a liquid crystal display in a mode for carrying out the invention.

A description will now be made with reference to FIGS. 1 to 6 on a substrate for a liquid crystal display and a liquid crystal display having the same in a mode for carrying out the invention. FIG. 1 shows a schematic configuration of the liquid crystal display in the present mode for carrying out the invention. As shown in FIG. 1, the liquid crystal display has abase structure that is provided by combining a TFT substrate 2 having a pixel electrode and a TFT formed in each pixel region thereof and an opposite substrate 4 having CF layers and a common electrode formed thereon in a face-to-face relationship and sealing a liquid crystal between the substrates.

The TFT substrate 2 is provided with a gate bus line driving circuit 30 loaded with driver ICs for driving a plurality of gate bus lines and a drain bus line driving circuit 32 loaded with driver ICs for driving a plurality of drain bus lines. The driving circuits 30 and 32 output scan signals and data signals to predetermined gate bus lines and drain bus lines based on predetermined signals output by a control circuit 34.

The opposite substrate 4 has a CF layer formed in any one of red (R), green (G) and blue (B) in each pixel region. Alignment films for aligning liquid crystal molecules in a predetermined direction are provided on surfaces of the substrates 2 and 4 opposite to each other.

A polarizer 37 is applied to a surface of the TFT substrate 2 that is opposite to the surface thereof on which the elements are formed. For example, a backlight unit 38 constituted by a linear primary light source and a planar light guide plate is provided on the side of the polarizer 37 opposite to the TFT substrate 2. A polarizer 36 is applied to a surface of the opposite substrate 4 that is opposite to the surface thereof on which the color filters are formed.

Figure 2A:
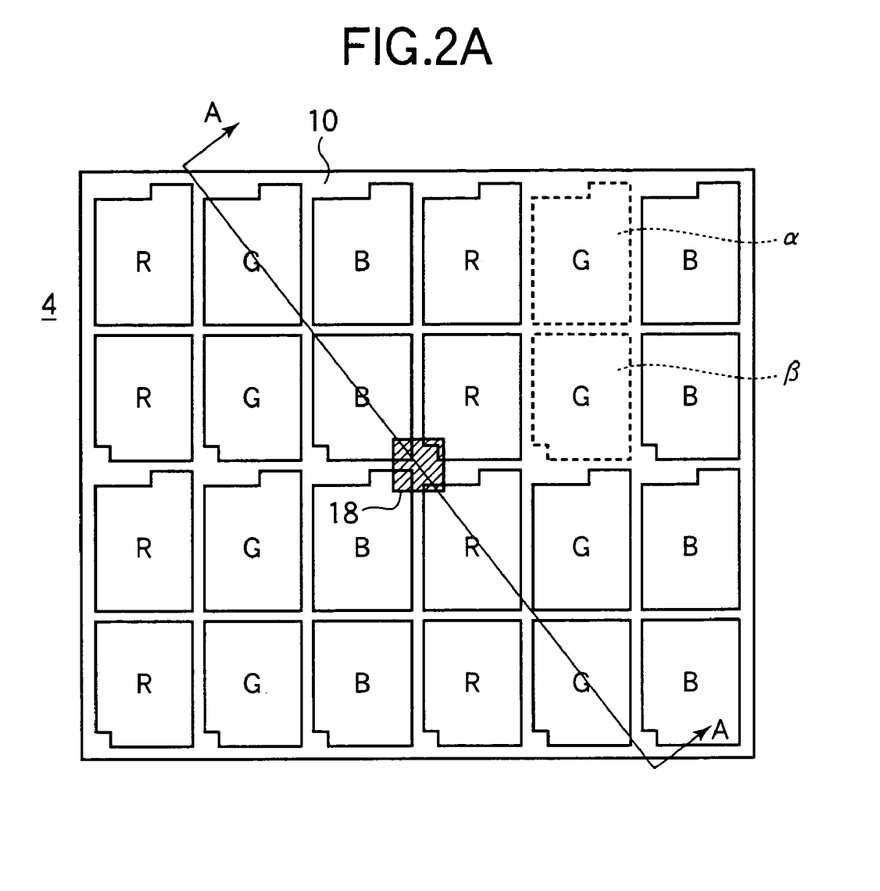
FIGS. 2A and 2B show configurations of a substrate for a liquid crystal display in the mode for carrying out the invention.
Figure 2B:
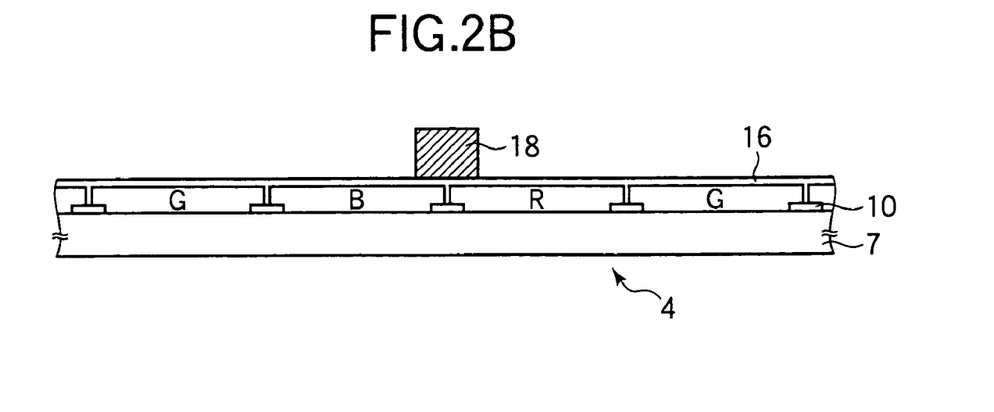

FIGS. 2A and 2B show configurations of the substrate for a liquid crystal display in the present mode for carrying out the invention. FIG. 2A shows configurations of twelve pixels on the opposite substrate 4, and FIG. 2B shows a sectional configuration of the opposite substrate 4 taken along the line A—A in FIG. 2A. As shown in FIGS. 2A and 2B, a BM 10 for blocking light is formed like a grid on a glass substrate 7 that constitutes the opposite substrate 4. Although not shown, TFTs, gate bus lines, and drain bus lines are formed on the TFT substrate 2 in regions that are shielded from light by the BM 10. Pixel regions are defined by the BM 10 on the opposite substrate 4. Since the BM 10 also serves as a light shield for storage capacitor bus lines (not shown) that are formed on the TFT substrate 2 such that they extend through the pixel regions substantially in the middle thereof, two apertures α and β as indicated by the broken lines in FIG. 2A constitutes one pixel.

The opposite substrate 4 has CF layers formed on the glass substrate 7. For example, the CF layers are formed of pigment-dispersion type photosensitive colored resins. The CF layers in each of the colors R, G and B are formed like stripes extending in the vertical direction in FIG. 2A, for example. A CF layer in any one of the colors R, G and B is formed in each pixel region. A common electrode 16 constituted by, for example, a transparent conductive film is formed throughout the substrate over the CF layers R, G and G. An alignment film is formed throughout the substrate over the common electrode 16 at a subsequent panel fabrication step.

Pillar spacers 18 for maintaining a cell gap are formed at intersections of the BM 10. For example, the pillar spacers 18 has a rectangular configuration when viewed from above, and one spacer is provided for every twelve pixels, for example. A pillar spacer 18 is provided such that it protrudes from the BM 10 into four neighboring pixel regions when viewed in a direction perpendicular to the surface of the substrate. CF layers in different colors, i.e., B and R are formed in each pair of pixel regions that are adjacent to each other in the horizontal direction in FIG. 2A among the four pixel regions. CF layers in the same color, i.e., B or R are formed in each pair of pixel regions that are adjacent to each other in the vertical direction in FIG. 2A among the four pixel regions.

A region having a liquid crystal alignment defect is formed around a pillar spacer 18 because of the influence of the spacer itself. In the present mode for carrying out the invention, a region having an alignment defect is uniformly distributed among a plurality of pixel regions to make an irregularity of display less visually perceptible, which makes it possible to suppress degradation of display characteristics. Thus, it is not required to form the BM 10 with a great width in order to shield the regions where the pillar spacers 18 are formed and the neighborhoods thereof from light. It is therefore possible to provide a liquid crystal display having high luminance and high display characteristics.

When importance is attached to suppression of any reduction in luminance attributable to alignment defects of the liquid crystal, the pillar spacers 18 are protruded only into pixel regions where the CF layers B are formed. Thus, reduction in luminance on the display screen can be minimized because the CF layers B have lower light transmittance compared to the CF layers R and G.

In the case of a liquid crystal display which must be subjected to a rubbing process, an alignment film is not sufficiently rubbed in a region around a pillar spacer 18. As a result, the alignment film in that region is not provided with a predetermined alignment regulating force, and a region having a liquid crystal alignment defect is formed around the pillar spacer 18. Such a region having an alignment defect is formed with a greater extent on the other side of the spacer 18 and a smaller extent on this side of the spacer when viewed in the rubbing direction. An irregularity of display can be made less visually perceptible to suppress degradation of display characteristics by providing the pillar spacer 18 taking the distribution of the region having an alignment defect into consideration to disperse the region having an alignment defect among a plurality of pixel regions substantially uniformly. Thus, it is not required to form the BM 10 with a great width in order to shield the regions where the pillar spacers 18 are formed and the neighborhoods thereof from light. It is therefore possible to provide a liquid crystal display having high luminance and high display characteristics.

Substrates for a liquid crystal display and liquid crystal displays having the same in the present mode for carrying out the invention will now be described with reference to specific embodiments.

Embodiment 1

Figure 3:
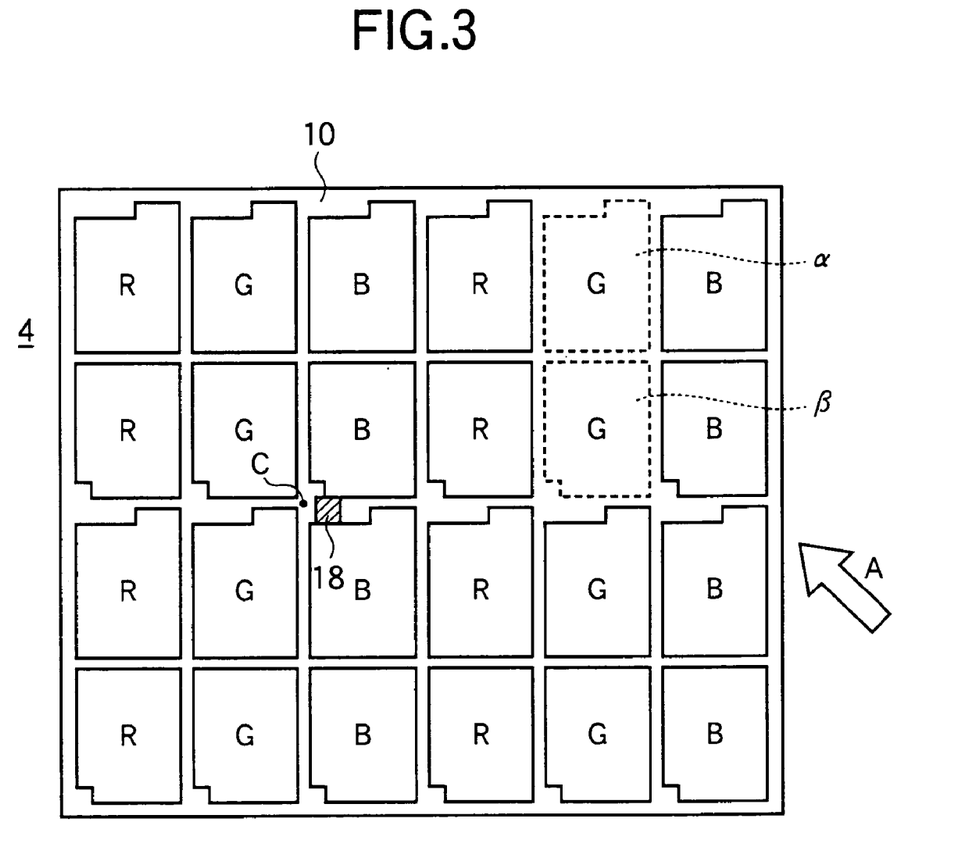
FIG. 3 shows a configuration of a substrate for a liquid crystal display according to Embodiment 1 in the mode for carrying out the invention.

A description will now be made with reference to FIGS. 3 and 4 on a substrate for a liquid crystal display and a liquid crystal display having the same according to Embodiment 1 in the present mode for carrying out the invention. FIG. 3 shows a configuration of an opposite substrate 4 of a TN mode liquid crystal display of the present embodiment. The arrow A in the figure indicates a direction in which the opposite substrate 4 of the present embodiment is rubbed. For example, the rubbing direction is left and upward in the figure. A direction in which a BM 10 extends (the vertical or horizontal direction in the figure) is at an angle of, for example, 45 deg. to the rubbing direction. The opposite substrate 4 has a pillar spacer 18 provided in a position that is biased in the direction opposite to the rubbing direction from an intersection C of the BM 10 formed like grids. The pillar spacer 18 of the present embodiment is provided on the BM 10 such that it does not protrude into any pixel region when viewed in a direction perpendicular to the surface of the substrate. For example, the pillar spacer 18 is provided such that two edges of the same, i.e., the upper and lower edges in the figure substantially coincide with edges of the BM 10 to be flush with the same.

Figure 4:
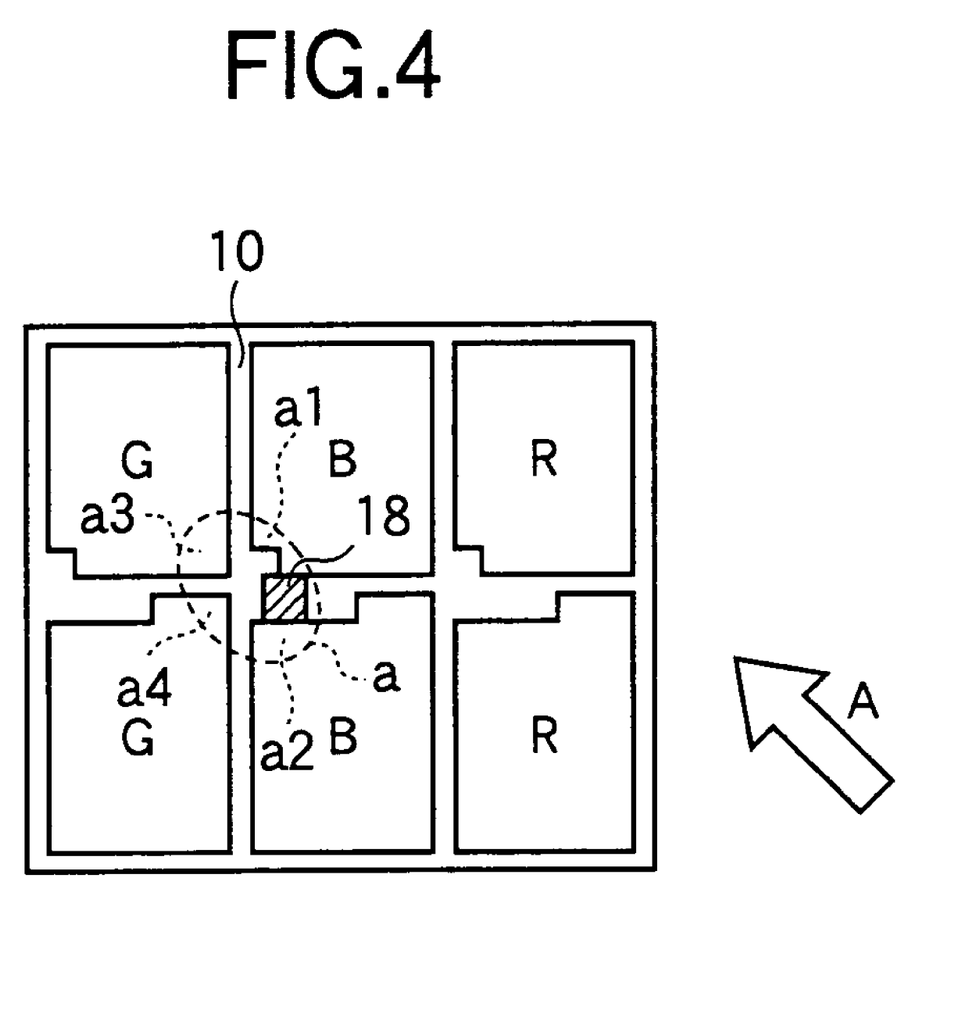
FIG. 4 shows a region having an alignment defect in a liquid crystal display according to Embodiment 1 of the mode for carrying out the invention.

FIG. 4 shows a region having a liquid crystal alignment defect in a liquid crystal display fabricated using the opposite substrate 4 shown in FIG. 3. As shown in FIG. 4, a substantially elliptic region a having an alignment defect is formed around the pillar spacer 18. The region a having an alignment defect is formed across four neighboring pixel regions. The region a having an alignment defect is formed with a greater extent on the other side of the pillar spacer 18 and a smaller extent on this side of the spacer when viewed in the rubbing direction.

Referring now to each of the pixel regions, a region a1 having an alignment defect, which is a part of the region a having an alignment defect, is formed in the pixel region located to the right of and above the pillar spacer 18 in the figure, and a region a2 having an alignment defect, which is a part of the region a having an alignment defect, is formed in the pixel region located to the right of and below the pillar spacer 18 in the figure. Similarly, a region a3 having an alignment defect is formed in the pixel region located to the left of and above the pillar spacer 18 in the figure, and a region a4 having an alignment defect is formed in the pixel region located to the left of and below the pillar spacer 18 in the figure. The regions a1 and a4 having an alignment defect are substantially equal in surface area, and the regions a2 and a3 having an alignment defect are substantially equal in surface area. It is desirable that all of the regions a1 to a4 having an alignment defect are substantially equal in surface area.

In the present embodiment, the pillar spacer 18 is provided taking the shape of the region a having an alignment defect into consideration to distribute the regions a1 to a4 having an alignment defect among the plurality of pixel regions substantially uniformly. This makes an irregularity of display less visually perceptible to make it possible to suppress degradation of display characteristics of the liquid crystal display. Thus, it is not required to form the BM 10 with a great width in order to shield the regions where the pillar spacers 18 are formed and the neighborhoods thereof from light. It is therefore possible to provide a liquid crystal display having high luminance and high display characteristics.

A method of manufacturing a substrate for a liquid crystal display according to the present embodiment will now be described. First, a film of a metal such as chromium (Cr) or a black resin film is formed throughout a top surface of a glass substrate and is patterned to form a grid-like BM 10. Next, a blue (B) resist which is a pigment-dispersion type photosensitive colored resin is applied throughout the substrate over the BM 10 to a thickness of, for example, 1.5 µm. Subsequently, the resist is exposed and developed using a photo-mask having a predetermined pattern written thereon and is subjected to post-baking to form CF layers B. Then, a red (R) resist which is a pigment-dispersion type photosensitive colored resin is similarly applied to a thickness of, for example, 1.5 µm and is patterned to form CF layers R. Subsequently, a green (G) resist which is a pigment-dispersion type photosensitive colored resin is similarly applied to a thickness of, for example, 1.5 µm and is patterned to form CF layers G. CF layers R, G and B in the form of stripes are thus formed. The order of the formation of the CF layers R, G, B is not limited to the above-described example. An overcoat layer may be formed by applying an acrylic resin or epoxy resin may be applied throughout the substrate over the CF layers R, G and B to provide a planar surface.

Next, a transparent conductive film such as an ITO (indium tin oxide) having a thickness of, for example, 150 nm is formed throughout the substrate using a sputtering process to form a common electrode. For example, an acrylic resin type negative photosensitive resist is then applied throughout the substrate over the common electrode and patterned to form pillar spacers 18 in predetermined positions with a configuration and density as shown in FIG. 3. The height of the pillar spacers 18 is, for example, 4.0 µm. An opposite substrate 4 as shown in FIG. 3 is completed through the above-described steps. Then, an alignment film is formed on the opposite substrate 4 and rubbed in a predetermined direction. The above-described opposite substrate 4 is then combined with a TFT substrate 2 which has been manufactured through an array fabrication step and which has been subjected to a predetermined aligning process on a surface thereof, and a liquid crystal is injected and sealed between the substrates 2 and 4 to complete a liquid crystal display. While the pillar spacers 18 are formed on the opposite substrate 4 in the present embodiment, they may alternatively be formed on the TFT substrate 2. As apparent from the above, the present embodiment results in no increase in the number of manufacturing steps and manufacturing cost when compared to liquid crystal displays according to the related art.

Embodiment 2

Figure 5:
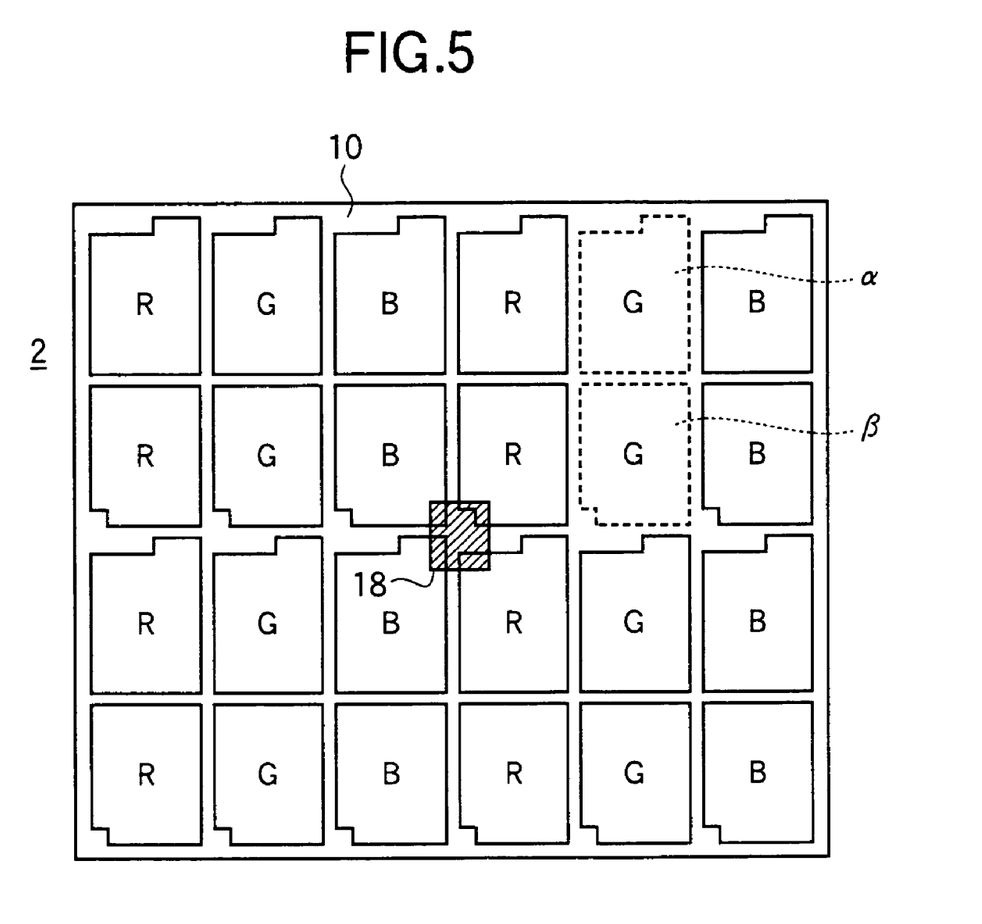
FIG. 5 shows a configuration of a substrate for a liquid crystal display according to Embodiment 2 in the mode for carrying out the invention.

A description will now be made with reference to FIGS. 5 and 6 on a substrate for a liquid crystal display and a liquid crystal display having the same according to Embodiment 2 in the present mode for carrying out the invention. FIG. 5 shows a configuration of a TFT substrate 2 of an MVA mode liquid crystal display of the present embodiment. The liquid crystal display of the present embodiment has a CF-on-TFT structure in which CF layers R, G and B are formed on the TFT substrate 2. As shown in FIG. 5, the TFT substrate 2 has a BM 10 formed like grids. The BM 10 shields TFTs and bus lines formed on the TFT substrate 2 from light. A pillar spacer 18 is formed on an intersection of the BM 10. The pillar spacer 18 is provided such that it protrudes from the BM 10 into four neighboring pixel regions when viewed in a direction perpendicular to the surface of the substrate. CF layers in different colors, i.e., B and R are formed in each pair of pixel regions that are adjacent to each other in the horizontal direction in FIG. 5 among the four pixel regions. CF layers in the same color, i.e., B or R are formed in each pair of pixel regions that are adjacent to each other in the vertical direction in FIG. 5 among the four pixel regions.

Figure 6:
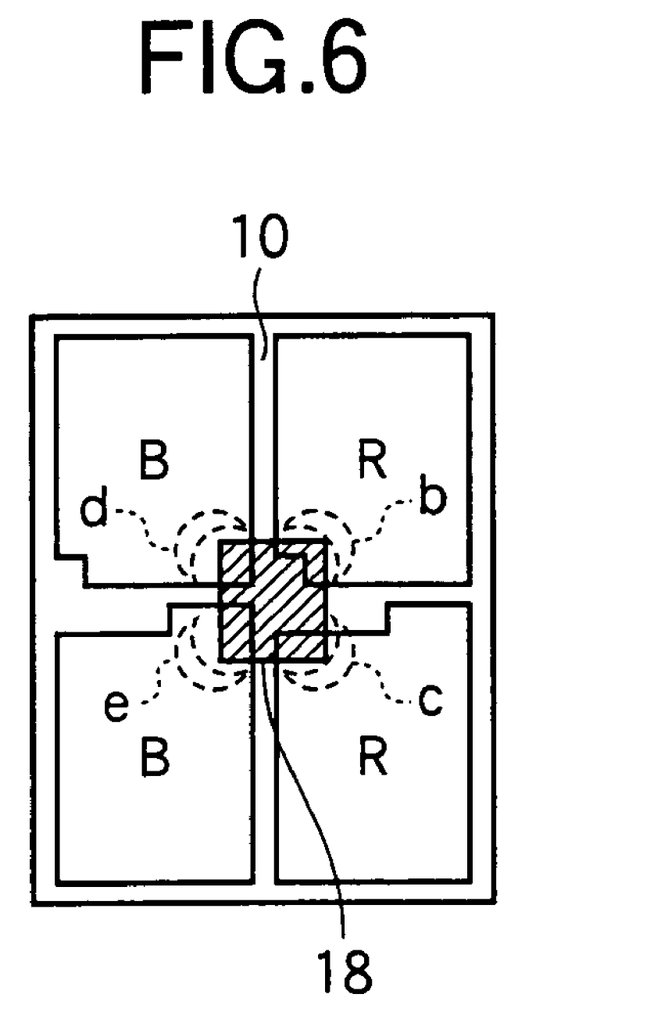
FIG. 6 shows regions having an alignment defect in a liquid crystal display according to Embodiment 2 in the mode for carrying out the invention.

FIG. 6 shows regions having a liquid crystal alignment defect in a liquid crystal display fabricated using the TFT substrate 2 shown in FIG. 5. As shown in FIG. 6, substantially crescent-shaped regions b to e having an alignment defect are formed around four respective corners of the pillar spacer 18 such that they detour around the corners. The region b having an alignment defect is located in the pixel region that is to the right of and above the pillar spacer 18 in the figure, and the region c having an alignment defect is located in the pixel region that is to the right of and below the pillar spacer 18 in the figure. The region d having an alignment defect is located in the pixel region that is to the left of and above the pillar spacer 18 in the figure, and the region e having an alignment defect is located in the pixel region that is to the left of and below the pillar spacer 18 in the figure. The regions b to e having an alignment defect are substantially equal to each other in surface area. No rubbing process is required for the liquid crystal display of the present embodiment that is in the MVA mode.

In the present embodiment, the regions b to e having an alignment defect are substantially uniformly distributed in the four pixel regions to make irregularities of display less visually perceptible, which makes it possible to suppress degradation of display characteristics. Thus, it is not required to form the BM 10 with a great width in order to shield the regions where the pillar spacers 18 are formed and the neighborhoods thereof from light. It is therefore possible to provide a liquid crystal display having high luminance and high display characteristics.

Further, the liquid crystal display of the present embodiment has the CF-on-TFT structure that allows both of higher definition and greater aperture ratio to be achieved. The present embodiment makes it possible to provide a liquid crystal display having high definition and a great aperture ratio because there is no need for forming the BM 10 with a great width.

A description will now be made on a method of manufacturing a substrate for a liquid crystal display and a liquid crystal display having the same according to the present embodiment. First, for example, an aluminum (Al) film having a thickness of 100 nm and a titanium (Ti) film having a thickness of 50 nm are formed in the order listed on an entire top surface of a glass substrate and are patterned to form gate electrodes of TFTs, gate bus lines and storage capacitor bus lines. Next, for example, a silicon nitride film (SiN film) having a thickness of 350 nm, an amorphous silicon (a-Si) layer having a thickness of 30 nm, and another SiN film having a thickness of 120 nm are continuously formed throughout the substrate. Patterning is then performed to form channel protection films in a self-aligning manner and to form active semiconductor layers in the form of islands. Next, an n$^+$a-Si layer having a thickness of 30 nm, a Ti layer having a thickness of 20 nm, an Al layer having a thickness of 75 nm, and another Ti layer having a thickness of 40 nm are formed in the order listed throughout the substrate and patterned to form source and drain electrodes of the TFTs and drain bus lines.

A red resist that is a pigment-dispersion type photosensitive colored resin is applied throughout the substrate over the source and drain electrodes and the drain bus lines to a thickness of, for example, 3.0 μm. Subsequently, the resist is exposed and developed using a photo-mask having a predetermined pattern drawn thereon and is subjected to post-baking to form CF layers. Then, a green resist that is a pigment-dispersion type photosensitive colored resin is similarly applied to a thickness of, for example, 3.0 μm and patterned to form CF layers G. Then, a blue resist that is a pigment-dispersion type photosensitive colored resin is similarly applied to a thickness of, for example, 3.0 μm and patterned to form CF layers B. The order of the formation of the CF layers R, G and B is not limited to the above-described example. Next, a film of a metal such as Cr is formed throughout the substrate over the CF layers R, G and B and patterned to form a BM 10. A transparent conductive film such as an ITO having a thickness of, for example, 70 nm is applied throughout the substrate and patterned to form a pixel electrode in each pixel region. If necessary, electrode blank sections (slits) are formed at the same time when the pixel electrodes are formed, and linear protrusions made of resist are alternatively formed on the pixel electrodes. The slits or linear protrusions function as alignment regulating structures for regulating the alignment of a liquid crystal.

For example, a novolac resin type positive photosensitive resist is then applied throughout the substrate over the pixel electrodes and patterned to form pillar spaces 18 in predetermined positions with a configuration and density as shown in FIG. 5. The height of the pillar spacers 18 is 4.0 μm, for example. A TFT substrate 2 for a liquid crystal display having the CF-on-TFT structure is completed through the above-described steps. A vertical alignment film is then formed on the TFT substrate 2. Next, the TFT substrate 2 is combined with an opposite substrate 4 which has been fabricated through predetermined steps, and a liquid crystal is injected and sealed between the substrates 2 and 4 to complete a liquid crystal display. While the pillar spacers 18 are formed on the TFT substrate 2 in the present embodiment, they may alternatively be formed on the opposite substrate 4. As thus described, the present embodiment results in no increase in the number of manufacturing steps and manufacturing cost when compared to liquid crystal displays according to the related art.

The invention is not limited to the above described modes for carrying out the same and may be modified in various ways.

For example, while transmissive liquid crystal displays have been referred to as examples in the above-described modes for carrying out the invention, the invention is not limited to them and may be applied to other liquid crystal displays such as reflective and transflective displays.

While active matrix liquid crystal displays have been referred to as examples in the above-described modes for carrying out the invention, the invention is not limited to them and may be applied to simple matrix type liquid crystal displays.

Further, while the BM 10 is formed of a metal or black resin in the above-described modes for carrying out the invention, the invention is not limited to the same. The BM 10 may be formed with a layered resin structure in which CF layers are overlaid one over another. For example, when a liquid crystal display having the CF-on-TFT structure is configured such that intervals between adjoining pixel regions are shielded from light with gate bus lines and drain bus lines formed on the TFT substrate 2 (bus line shielding), the gate bus lines and drain bus lines function as a BM 10.

As described above, the present invention makes it possible to provide a liquid crystal display having high luminance and high display characteristics.

What is claimed is:

1. A liquid crystal display, comprising:
   a pair of substrates provided opposite to each other;
   a liquid crystal sealed between the substrates;
   a light-shielding film formed like a grid on one of the substrates, wherein the grid defines a frame made of light shielding material that divides the light shielding film into a plurality of cells that lack light shielding material;
   a plurality of pixel regions defined by the light-shielding film, wherein said pixel regions are within the cells; and
   a pillar spacer located between substrates and being provided such that a plurality of regions having an alignment defect of the liquid crystal are created, because of said pillar spacer, across adjoining ones of the pixel regions when viewed in a direction perpendicular to the surface of one of the substrates.

2. A liquid crystal display according to claim 1, wherein the pillar spacer is provided such that parts of the region having an alignment defect formed respectively in the adjoining pixel regions are substantially equal to each other in surface area.

3. A liquid crystal display according to claim 1, wherein the pillar spacer is formed on the light-shielding film and provided such that it protrudes from the light-shielding film into the adjoining pixel regions when viewed in the direction perpendicular to the surface of one of the substrates.

4. A liquid crystal display according to claim 3, wherein one of the substrates has color filter layers in a plurality of colors formed in the pixel regions and wherein the pillar spacer is provided such that it protrudes into the adjoining pixel regions in which the color filter layers are formed in different colors.

5. A liquid crystal display according to claim 3, wherein one of the substrates has color filter layers in a plurality of colors formed in the pixel regions and wherein the pillar spacer is provided such that it protrudes into the adjoining pixel regions in which the color filter layers are formed in the same color.

6. A liquid crystal display according to claim 5, wherein the same color is blue.

7. A liquid crystal display according to claim 1, wherein one of the substrates has a thin film transistor formed in each of the pixel regions.

8. A liquid crystal display according to claim 1, further comprising an alignment film formed on the pillar spacer and rubbed in a predetermined rubbing direction, wherein the pillar spacer is provided in a position that is biased in the direction opposite to the rubbing direction from an intersection of the light-shielding film.

9. A substrate for a liquid crystal display, comprising:

a light-shielding film formed like a grid on a base substrate, wherein the grid defines a frame made of light shielding material that divides the light shielding film into a plurality of cells that lack light shielding material;

a plurality of pixel regions defined by the light-shielding film, wherein the pixel regions are within the cells; and a pillar spacer which is formed on the light-shielding film and provided such that it protrudes from the light shielding film into adjoining ones of the pixel regions when viewed in a direction perpendicular to the surface of the base substrate.

* * * * *